(12) United States Patent
Jo

(10) Patent No.: US 9,985,469 B2
(45) Date of Patent: May 29, 2018

(54) DISPLAY APPARATUS AND CONTROLLING METHOD THEREOF

(71) Applicant: SAMSUNG ELECTRONICS CO., LTD., Suwon-si, Gyeonggi-do (KR)

(72) Inventor: Kun-hee Jo, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 14/922,860

(22) Filed: Oct. 26, 2015

(65) Prior Publication Data

US 2016/0126782 A1 May 5, 2016

(30) Foreign Application Priority Data

Oct. 30, 2014 (KR) .................. 10-2014-0149043

(51) Int. Cl.
*H01H 47/00* (2006.01)
*H02J 9/00* (2006.01)
*G09G 3/20* (2006.01)
*H02J 7/00* (2006.01)

(52) U.S. Cl.
CPC ............... *H02J 9/005* (2013.01); *G09G 3/20* (2013.01); *G09G 2330/021* (2013.01); *H02J 7/0047* (2013.01); *H02J 7/0068* (2013.01)

(58) Field of Classification Search
CPC .. H02J 9/005; H02J 7/0068; G09G 2330/021; G09G 3/20
USPC ........................................................ 307/126
See application file for complete search history.

(56) References Cited

U.S. PATENT DOCUMENTS

| | | | |
|---|---|---|---|
| 2009/0156268 A1* | 6/2009 | Kim ................ | H02J 7/025 455/573 |
| 2010/0299543 A1* | 11/2010 | Kim ................ | G06F 1/266 713/320 |
| 2012/0288288 A1* | 11/2012 | Imaizumi ......... | G03G 15/80 399/38 |
| 2013/0093242 A1* | 4/2013 | Mok ................ | H02J 9/005 307/23 |

* cited by examiner

*Primary Examiner* — Jared Fureman
*Assistant Examiner* — Duc M Pham
(74) *Attorney, Agent, or Firm* — Staas & Halsey LLP

(57) ABSTRACT

A display apparatus and a controlling method thereof are provided. The display apparatus includes a power supply configured to supply power to the display apparatus using one of a battery or AC power and a controller configured to, in response to a mode of the display apparatus being a standby mode, control the power supply to supply power to standby power to the display apparatus using the battery. The display apparatus may reduce power consumption in a standby mode by half.

15 Claims, 10 Drawing Sheets

| BATTERY LEVEL | STANDBY MODE | NORMAL MODE |
|---|---|---|
| MORE THAN 70% | CONSUME ONLY POWER OF BATTERY | CONSUME POWER BY AC POWER AND RECHARGE BATTERY |
| MORE THAN 40% LESS THAN 70% | CONSUME BATTERY AND AC POWER FOR SAME TIME ALTERNATELY | |
| LESS THAN 40 | CONSUME POWER BY AC POWER AND RECHARGE BATTERY | |

DISPLAY APPARATUS AND CONTROLLING METHOD THEREOF

CROSS-REFERENCE TO RELATED APPLICATIONS

This application claims priority from Korean Patent Application No. 10-2014-0149043, filed in the Korean Intellectual Property Office on Oct. 30, 2014, the disclosure of which is incorporated herein by reference.

BACKGROUND

1. Field

Aspects of the exemplary embodiments relate to a display apparatus and a controlling method thereof, and more particularly, to a display apparatus where a battery is inserted and a controlling method thereof.

2. Description of the Related Art

Generally, even when a user does not use a display apparatus such as a TV, the user keeps connecting the display apparatus to AC power. When a display apparatus is connected to AC power, the display apparatus consumes power even when it remains in a standby mode.

Accordingly, there is a need for a method for reducing standby power which is consumed by a display apparatus in a standby mode.

SUMMARY

An aspect of the exemplary embodiments relates to a display apparatus to reduce the consumption of standby power which is the power consumed by a display apparatus in a standby mode, and a controlling method thereof.

According to an exemplary embodiment, there is provided a display apparatus including a power supply configured to supply power to the display apparatus using one of a battery or AC power and a controller configured to, in response to a mode of the display apparatus being a standby mode, control the power supply to supply standby power to the display apparatus using the battery.

The controller, in response to a mode of the display apparatus being a normal mode, may control the power supply to recharge the battery using the AC power.

The controller, in response to measuring a battery level of the battery and determining that a battery level of the battery is less than a first threshold value and equal to or more than a second threshold value, may control the power supply to supply standby power to the display apparatus using the battery and the AC power alternately.

The power supply may further include a switch configured to switch the AC power and the battery, and the controller may control the switch to use the battery and the AC power alternately.

The controller, in response to a battery level of the battery being less than a second threshold value, may control the power supply to supply standby power to the display apparatus using the AC power and to recharge the battery.

The controller may include a sub controller configured to be turned on and control the display apparatus while the display apparatus maintains a standby mode, and the sub controller, in response to a mode of the display apparatus being a standby mode, may determine a battery level of the battery.

The apparatus may further include a display, and the controller, in response to the battery being recharged, may control the display to display a UI to indicate that the battery is being recharged.

The controller, in response to the battery being recharged, may control to output an indicator indicating that the battery is being recharged.

According to an exemplary embodiment, there is provided a controlling method of a display apparatus including determining a mode of a display apparatus including a battery, and in response to the mode being a standby mode, supplying standby power to the display apparatus using the battery.

The method may further include, in response to a mode of the display apparatus being a normal mode, recharging the battery using AC power.

The method may further include measuring a battery level of the battery, and the supplying standby power may include, in response to determining that a battery level of the battery is less than a first threshold value and equal to or more than a second threshold value, supplying standby power to the display apparatus using the battery and the AC power alternately.

The supplying standby power may include using the battery and the AC power alternately by controlling a switch configured to switch the battery and the AC power.

The supplying standby power may include, in response to a battery level of the battery being less than a second threshold value, supplying standby power to the display apparatus using the AC power and to recharging the battery.

The measuring a battery level of the battery may include determining a battery level of the battery by a sub controller configured to be turned on and control the display apparatus while the display apparatus maintains a standby mode.

The method may further include, in response to the battery being recharged, displaying a UI to indicate that the battery is being recharged.

The method may further include, in response to the battery being recharged, outputting an indicator indicating that the battery is being recharged.

According to the various exemplary embodiments, a user may user a display apparatus which reduces consumption of standby power.

BRIEF DESCRIPTION OF THE DRAWINGS

The above and/or other aspects of the concept will be more apparent by describing certain exemplary embodiments of the concept with reference to the accompanying drawings, in which:

FIG. 4 is a view provided to explain power consumption according to a battery level of a display apparatus according to an exemplary embodiment;

DETAILED DESCRIPTION

Figure 1:
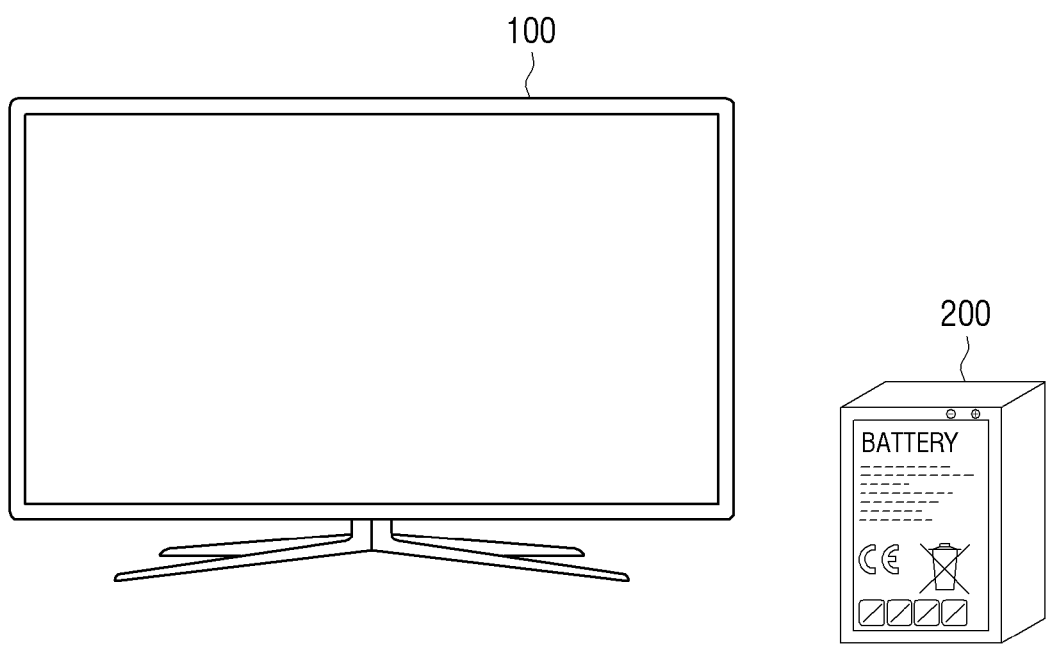
FIG. 1 is a view illustrating a display apparatus and a battery inserted therein according to an exemplary embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiments of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

FIG. 1 is a view illustrating a display apparatus 100 and a battery 200 according to an exemplary embodiment. As illustrated in FIG. 1, the display apparatus 100 may be a TV, but this is only an example. The display apparatus 100 may be realized as various electronic apparatuses which include a display and may be maintained in a standby mode, such as mobile phone, tablet PC, digital camera, camcorder, notebook PC, desktop, PDA, MP3, etc.

The battery 200 is an electric cell which may supply electric energy to a connected electronic apparatus. In particular, the battery 200 is a secondary cell which can be reused as it is supplied with power from outside and recharged.

The battery 200 may be inserted into the display apparatus 100. In other words, the battery 200 may be built in a part of the display apparatus 100. The battery 200 may be detachably built-in after removing a cover which covers part of the display apparatus 100, but this is only an example.

The battery 200 may be fixedly built-in the display apparatus 100, such that it cannot be detached without disassembling the display apparatus 100.

In particular, if the display apparatus 100 is realized as a TV, the size of the display apparatus 100 and the battery is relatively large, and the battery 200 inside the display apparatus 100 used in a house or in an office is rarely replaced. Thus, in many cases, the battery 200 is fixedly built in the display apparatus 100 such that it cannot be detached without disassembling the display apparatus 100.

Hereinafter, the configuration of the display apparatus 100 where the battery 200 is inserted will be described in detail with reference to FIGS. 2 and 3.

Figure 2:
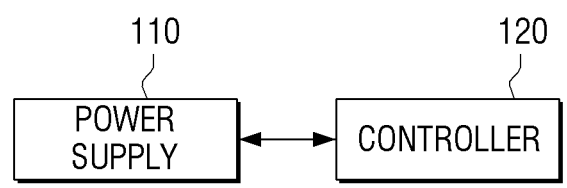
FIG. 2 is a block diagram illustrating configuration of a display apparatus briefly according to an exemplary embodiment.

FIG. 2 is a block diagram illustrating configuration of the display apparatus 100 briefly according to an exemplary embodiment. As illustrated in FIG. 2, the display apparatus 100 may include a power supply 110 and a controller 120.

The power supply 110 supplies power to the display apparatus 100. In particular, the power supply 110 may supply power to the display apparatus 100 using either one of a battery and AC power.

In other words, the power supply 110 may allow external AC power to be supplied to the display apparatus 100. In addition, the power supply 110 may allow power to be supplied to the display apparatus 100 using power of a built-in battery.

Specifically, in general, an electric outlet to supply power to various electronic apparatuses is provided in a place, such as a house and an office, where the display apparatus 100 is widely used. Accordingly, if a plug included in the display apparatus is inserted into an electric outlet, the power supply 110 may supply external AC power to the display apparatus 100. In addition, the power supply 110 may supply power to the display apparatus 100 using the battery 200 which is built in the display apparatus 100. In particular, the power supply 110 may supply power to the display apparatus 100 using at least one of the AC power and the built-in battery 200 according to mode of the display apparatus 100 and a battery level of the battery 200.

Meanwhile, the controller 120 controls the display apparatus 100 on the whole. If the display apparatus 100 is in a standby mode, the controller 120 may control the power supply 110 to supply power to the display apparatus 100 using the battery 200.

On the other hand, if the execution mode of the display apparatus 100 is a normal mode, the controller 120 may control to recharge the battery 200 using AC power. The normal mode refers to a mode where general booting is performed, so that power is supplied to all elements of the display apparatus 100 including a display and O/S booting is performed.

Meanwhile, if the display apparatus 100 is in a standby mode, the controller 120 may measure a battery level of the battery 200. Specifically, when the battery level of the battery 200 is measured to less than a first threshold value and more than a second threshold value, the controller 120 may control power supply 110 to supply standby power to the display apparatus 100 by using the battery 200 and the AC power alternately.

If the battery level of the battery 200 is measured to be less than the second threshold value, the controller 120 may control the power supply 110 to supply standby power to the display apparatus 100 using the AC power and recharge the battery 200.

Figure 3:
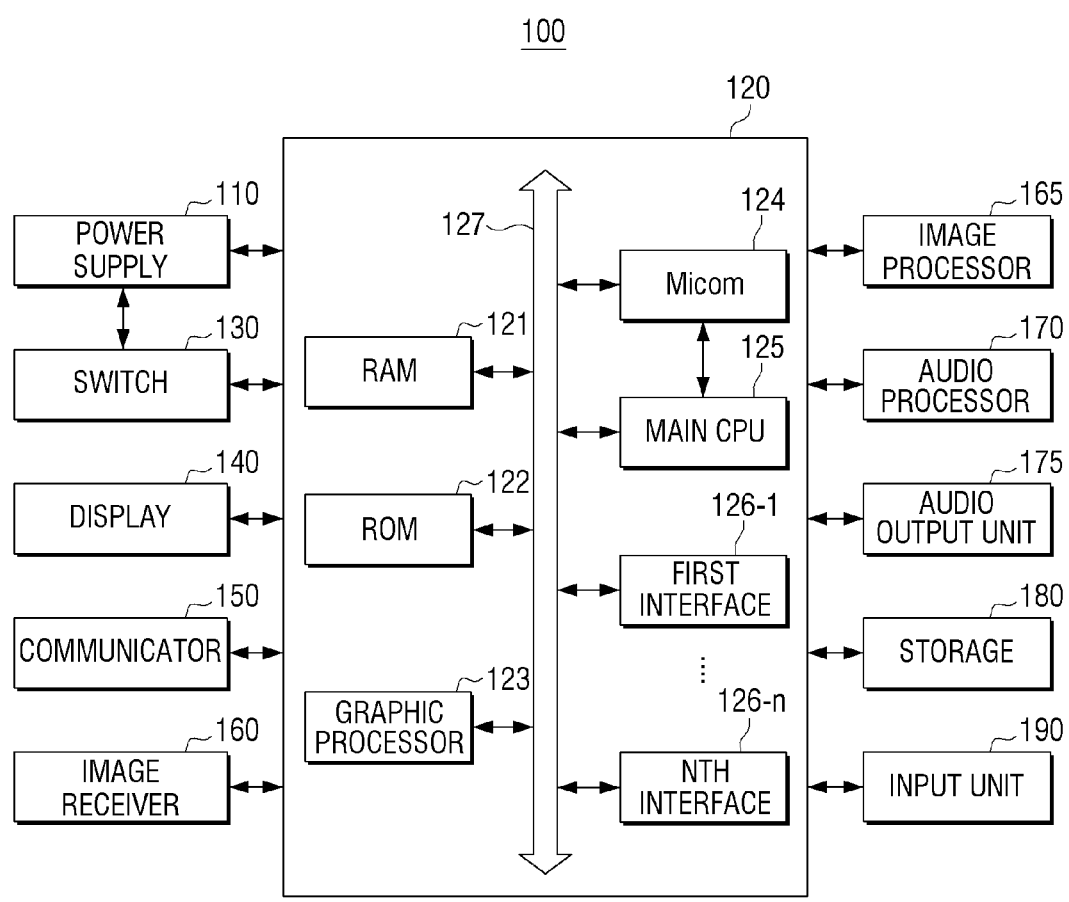
FIG. 3 is a block diagram illustrating configuration of a display apparatus in detail according to an exemplary embodiment.

Meanwhile, FIG. 3 is a block diagram illustrating the configuration of the display apparatus 100 in detail according to an exemplary embodiment. As illustrated in FIG. 3, the display apparatus 100 may further include a switch 130, a display 140, a communicator 150, an image receiver 160, an image processor 165, an audio processor 170, an audio output unit 175, storage 180, and an input unit 190 in addition to the power supply 110 and the controller 120.

FIG. 3 illustrates various elements assuming that the display apparatus 100 includes the battery 200, and provides various functions such as a communication function like a Bluetooth communication function, standby mode function, instant booting function, user voice recognition function, video play function, display function, etc. Accordingly, depending on exemplary embodiments, some of the elements illustrated in FIG. 3 may be omitted or changed, and other elements may be added. The descriptions regarding the elements of FIG. 3 which have been provided above will be omitted.

The power supply 110 supplies power to the display apparatus 100. In particular, the power supply 110 may allow external AC to be supplied to the display apparatus 100.

In other words, the power supply 110 may allow external AC power to be supplied to the display apparatus 100. In addition, the power supply 110 may allow power to be supplied to the display apparatus using the built-in battery 200.

Meanwhile, the switch 130 is provided to switch a means for supplying power to the display apparatus 100. In particular, the switch 130 may be realized as a chip or a circuit which connects each of the AC power and the battery 200 to the power supply alternately.

The display 140 displays an image. The display 140 may display a content which is received through a broadcast channel. In other words, the display 140 may display at least one of video frames which are generated as image data is received from the image receiver 150 and processed by the image processor 160 and various screens generated by the graphic processor 123.

In addition, the display 140 may display content received through a broadcast channel. In other words, the display apparatus 100 may receive various broadcast signals transmitted from a broadcasting station through an RF communication network and receive content from various servers through an IP network, and the display apparatus 110 may display the received content.

Meanwhile, the display 140 may display various UIs (user interfaces). In particular, if the battery level of the battery 200 is determined to be less than a threshold value while the display apparatus 100 maintains a normal mode and thus, the battery is recharged, the display 140 may display a UI to indicate that the battery 200 is being recharged. In addition, once the recharging of the battery 200 is completed, the display 140 may display a UI which indicates that the recharging of the battery is completed. Even when the battery 200 is not being recharged, the display 140 may display a battery level of the battery 200 using a number or a figure.

The communicator 150 performs communication with various types of external apparatuses or external servers including the external controller 200 according to various types of communication methods. In other words, the communicator 140 may include various types of communication modules to perform communication with external apparatuses or external servers.

The communicator 150 may include various communication modules such as a Bluetooth module, a WiFi module, and an NFC module, but this is only an example. The communicator 150 may further include various communication modules such as a wireless communication module.

In this case, the the Bluetooth module, the WiFi module, and the NFC module perform communication according to a Bluetooth method, a WiFi method, and an NFC method, respectively. The NFC module represents a chip which operates according to an NFC method which uses 13.56 MHz band among various RF-ID frequency bands such as 135 kHz, 13.56 MHz, 433 MHz, 860~960 MHz, 2.45 GHz, and so on. In the case of using the Bluetooth module or the WiFi module, connection information, such as an SSID and a session key, may be transmitted/received first for communication connection and then, information may be transmitted/received. The wireless communication module represents a module which performs communication according to various communication standards such as IEEE, Zigbee, $3^{rd}$ Generation (3G), $3^{rd}$ Generation Partnership Project (3GPP), Long Term Evolution (LTE) and so on.

Meanwhile, the image receiver 160 receives image data through various sources. For example, the image receiver 160 may receive broadcast data from an external broadcasting station, image data from an external server in real time, and image data stored in an internal storage 180.

The image processor 165 processes image data received from the image receiver 160. The image processor 160 may perform various image processing operations with respect to image data, such as decoding, scaling, noise filtering, frame rate conversion, resolution conversion, etc.

The audio processor 170 processes audio data. The audio processor 170 may perform various processing with respect to audio data, such as decoding, amplification, noise filtering, etc. The audio data processed by the audio processor 240 may be output to the audio output unit 175.

The audio output unit 175 outputs not only various audio data but also various alarm sounds or voice messages which are processed by the audio processor 170. Here, the audio output unit 180 may be realized as a speaker, but this is only an example. The audio output unit 180 may be realized as an audio terminal.

Meanwhile, the storage 180 stores various modules to drive the display apparatus 100. For example, the storage 180 may store software including a base module, a sensing module, a communication module, a presentation module, a web browser module, and a service module. In this case, the base module refers to a basic module which processes a signal transmitted from the hardware included in the display apparatus 100, and transmits the processed signal to an upper layer module. The sensing module is a module which collects information from various sensors, and analyzes and manages the collected information. The sensing module may include a face recognition module, a voice recognition module, a motion recognition module, and an NFC recognition module, and so on. The presentation module is a module to compose a display screen. The presentation module includes a multimedia module for reproducing and outputting multimedia contents, and a UI rendering module for UI and graphic processing. The communication module is a module to perform communication with outside. The service module is a module including various applications for providing various services.

As described above, the storage 180 may include various program modules, but some of the various program modules may be omitted or changed, or new modules may be added according to the type and characteristics of the display apparatus 100. For example, if the display apparatus 100 is realized as a smart phone, the base module may further include a location determination module to determine a GPS-based location, and the sensing module may further include a sensing module to detect a user's operation.

Meanwhile, the input unit 190 receives a user command. Here, the input unit 130 may be realized as a remote controller including four directions keys of up, down, left, and right directions and an enter key, but this is only an example. The input unit 190 may be realized as various input apparatuses, such as a touch screen, a mouse, a pointing device, etc.

The input unit 190 may receive a user command to select power provided to the display apparatus 100, between the AC power and the battery 200. In addition, the input unit 190 may receive a user command regarding whether to use the power of the battery 200 which is built in the display apparatus 100.

Meanwhile, the controller 120 controls the overall operations of the display apparatus 100 using various programs stored in the storage 180. In particular, if the display apparatus 100 is in a standby mode, the controller 120 may control the power supply 110 to supply standby power to the display apparatus 100 using the battery 200. If the display apparatus 100 is in a normal mode, the controller 120 may control the power supply 110 to supply standby power to the display apparatus 100 using the AC power.

Specifically, before the display apparatus 100 enters a standby mode or while the display apparatus 100 maintains a standby mode, the controller 120 may measure the battery level of the battery 200 which is built in the display apparatus 100 or detachably provided in the display apparatus 100. If the battery level of the battery 200 is measured to be less than the first threshold value and more than the second threshold value, the controller 120 may control to supply standby power to the display apparatus 100 by using the battery 200 and the AC power alternately.

In addition, if the battery level of the battery 200 is more than the first threshold value, the controller 120 may control to supply standby power to the display apparatus 100 using the battery 200. If the battery level of the battery 200 is less than the second threshold value, the controller 120 may supply standby power to the display apparatus 100 using the AC power and control to recharge the battery 200.

In particular, the controller 120 may control the switch 130 to switch a power supply to supply power to the display apparatus 100. For example, if the display apparatus 100 is in a standby mode and the battery level of the battery 200 is less than the first threshold value and more than the second threshold value, the controller 120 may control the switch 130 to switch a power supply at an interval of ten minutes. In other words, the controller 120 may control the switch 130 to supply power to the display apparatus 100 by using the AC power for the first ten minutes, and control the switch 130 to supply power to the display apparatus 100 by using the battery 200 for the next ten minutes. While the display apparatus 100 maintains the standby mode, the controller 120 may control the switch 130 to switch a power supply at a predetermined interval.

Meanwhile, the controller 120 may include a main controller and a sub controller. In other words, the main controller may refer to a main CPU, and the sub controller may refer to a Micom which allows power to be supplied in a standby mode to control the display apparatus 100.

Specifically, as illustrated in FIG. 3, the controller 120 includes a RAM 121, a ROM 122, a graphic processor 123, a Micom 124, a main CPU 125, a first to nth interface 126-1~126-n, and a bus 147. Here, the RAM 121, the ROM 122, the graphic processor 123, the Micom 124, the main CPU 125, the first to the nth interface 126-1~126-n, etc. may be interconnected through the bus 147.

The ROM 122 stores a set of commands for system booting. If a turn-on command is input and thus, power is supplied, the main CPU 125 copies the O/S stored in the storage 190 into the RAM 121 according to a command stored in the ROM 122, and boots a system by executing the O/S. When the booting is completed, the main CPU 125 copies various application programs stored in the storage 190 into the RAM 121, and executes the application programs copied into the RAM 121 to perform various operations.

The graphic processor 123 generates a screen including various objects such as an icon, an image, a text, etc. using a computing unit (not shown) and a rendering unit (not shown). The computing unit computes property values such as coordinates, shape, size, and color of each object to be displayed according to the layout of the screen using a control command received from an input unit. The rendering unit generates a screen with various layouts including objects based on the property values computed by the computing unit. The screen generated by the rendering unit is displayed in a display area of the display 130. In particular, the graphic processor 123 may generate an external apparatus list and a content list according to a user command.

The main CPU 125 accesses the storage 190, and performs booting using an Operating System (O/S) stored in the storage 190. In addition, the main CPU 125 performs various operations using various programs stored in the storage 190.

The first to the nth interface 126-1 to 126-n are connected to the above-described various elements. One of the interfaces may be network interface which is connected to an external apparatus via a network.

In particular, when the display apparatus 100 enters a standby mode, the Micom 124 which is turned on may measure the battery level of the battery 200. If the battery level of the battery 200 is measured to be less than the first threshold value and more than the second threshold value, the Micom 124 may control to supply standby power to the display apparatus 100 using the battery and the AC power alternately.

If the battery level of the battery is more than the first threshold value, the Micom 124 may control to supply standby power to the display apparatus 100 using the battery 200. If the battery level of the battery 200 is less than the second threshold value, the Micom 124 may supply standby power to the display apparatus 100 using the AC power, and control to recharge the battery 200. In particular, the Micom 124 may control the switch 130 to switch a power supply means to supply power to the display apparatus 100.

Meanwhile, if the battery 200 is being recharged in a standby mode, the Micom 124 may control to output an indicator which indicates that the battery 200 is being recharged. For example, the Micom 124 may control the color of an LED provided on a bezel of the display apparatus 100 or the number or frequency of the flickering of the LED in order to inform a user that the battery 200 is being recharged.

The above exemplary embodiment where when the display apparatus 100 enters a standby mode, the Micom 124 which is turned on measures the battery level of the battery 200 is only an example. Before the display apparatus 100 enters a standby mode, the main CPU 125 may measure the battery level of the battery 200, and control to store the measured value in the Micom 124.

According to the above-described display apparatus 100 where a battery can be built in or detachably attached, a user may use the display apparatus with less standby power.

FIG. 4 is a view provided to explain power consumption and recharging according to a battery level of the battery 200 of the display apparatus 100 according to an exemplary embodiment.

The display apparatus 100 may measure the battery level of the battery 200. While the display apparatus 100 maintains a normal mode, the controller 120 such as the Micom 124 or the main CPU 125 may measure the battery level of the battery 200. In addition, even after the display apparatus 100 enters a standby mode, the Micom 124 may measure the battery level of the battery 200.

The battery level of the battery 200 measured by the display apparatus 100 may be represented by [Ah] unit. Ampere-Hour (Ah) is a unit representing capacity of the battery 200 and is calculated, if the battery 200 discharges an electric current, by multiplying the amount of the electric current with the discharge time.

Accordingly, as the display apparatus 100 measures the battery level of the battery 200, the display apparatus 100 may determine what percentage of the battery charge is left in comparison with the entire change capacity of the battery 200.

FIG. 4 illustrates power consumption and recharging in an exemplary embodiment where the battery charge levels of 70% and 40% of the battery 200 are set as threshold values.

As illustrated in FIG. 4, if the battery charge level of the battery 200 is more than 70% of the entire capacity of the battery 200, the display apparatus 100 may enter a standby mode and consume only the power of the battery 200. Accordingly, the power consumption of the display apparatus 100 by the AC power may be '0'.

If the battery level of the battery 200 is more than 40% and less than 70% of the entire capacity of the battery 200, the display apparatus 100 may enter a standby mode and control to consume standby power by using the battery 200 and the AC power alternately for at the same time interval.

For example, the display apparatus 100 may consume power using the AC power for the first ten minutes, and consume standby power using the battery 200 for the next ten minutes. However, consuming standby power by using the battery 200 and the AC power alternately for ten minutes is only an example, and the display apparatus 100 may change the time interval for using the battery 200 and the AC power according to a setting.

If the battery level of the battery 200 is 40% after the battery 200 and the AC power were used alternately, the display apparatus 100 may recharge the battery 200 while consuming power using the AC power. After the battery level of the battery 200 becomes more than 40%, the display apparatus 100 may control to consume standby power by using the battery 200 and the AC power alternately at the same time interval. In addition, the display apparatus 100 may control to consume standby power by using the AC power until the battery level of the battery 200 becomes 70% of the entire capacity.

In a normal mode where the booting of the display apparatus 100 is performed, the display apparatus 100 may recharge the battery 200 while consuming power by using the AC power. When the battery level of the battery 200 reaches a certain level, such as 70%, the display apparatus 100 may stop recharging the battery 200 while maintaining the normal mode and consume power by using the AC power.

As described above, FIGS. 5A and 5B are views provided to explain an effect of consuming standby power by using the battery 200 and the AC power alternately.

Figure 5A:
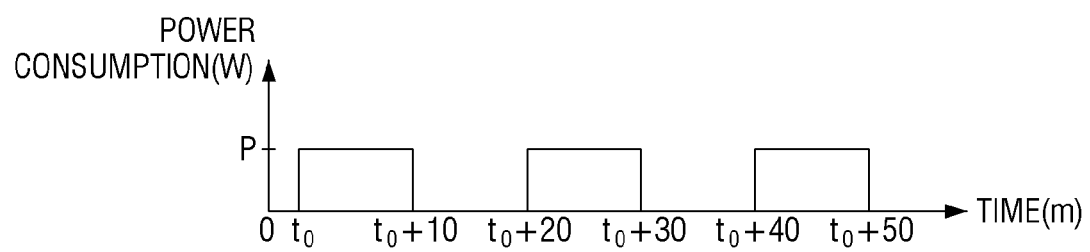
FIGS. 5A and 5B are views provided to explain power consumption of a display apparatus according to an exemplary embodiment.

If the display apparatus 100 enters a standby mode at the time of t0, the display apparatus 100 may consume standby power by using the AC power for the first ten minutes. Accordingly, as illustrated in FIG. 5A, from t0 to t0+10, the display apparatus 100 may consume the power of P(W).

For the next ten minutes, the display apparatus 100 may consume standby power by using the battery 200. Accordingly, as illustrated in FIG. 5A, from t0+10 to t0+20, the display apparatus consumes standby power only using the battery 200, consuming the power of 0(W).

Figure 5B:

As the standby power is consumed by changing the power supply at the interval of ten minutes, the average power consumption in the standby mode may become ½P(W) as illustrated in FIG. 5B. In other words, by using the AC power and the battery 200 alternately, the display apparatus 100 may reduce power consumption in the standby mode by half in comparison with when using the AC power only.

Figure 6:
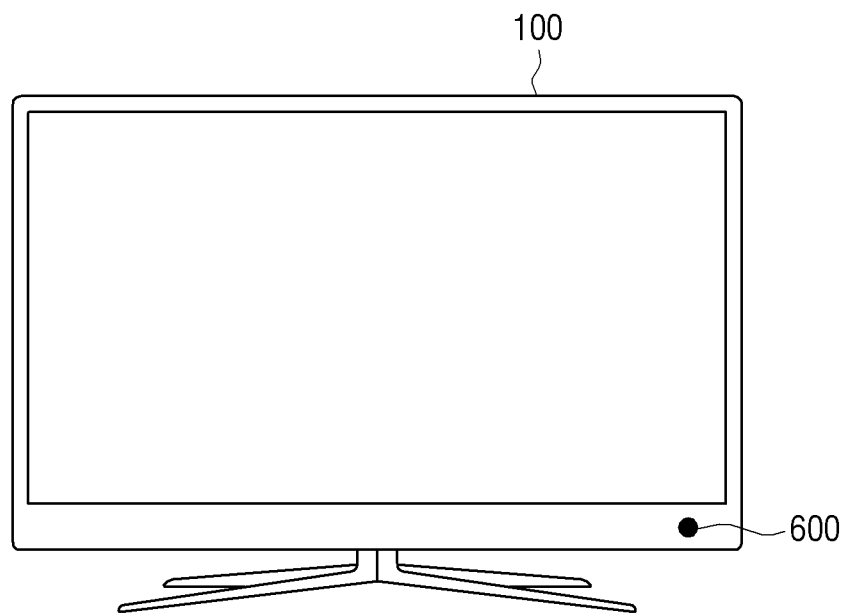
FIG. 6 is a view illustrating that a display apparatus displays an indicator to indicate that a battery is being recharged in a standby mode according to an exemplary embodiment.
Figure 7:
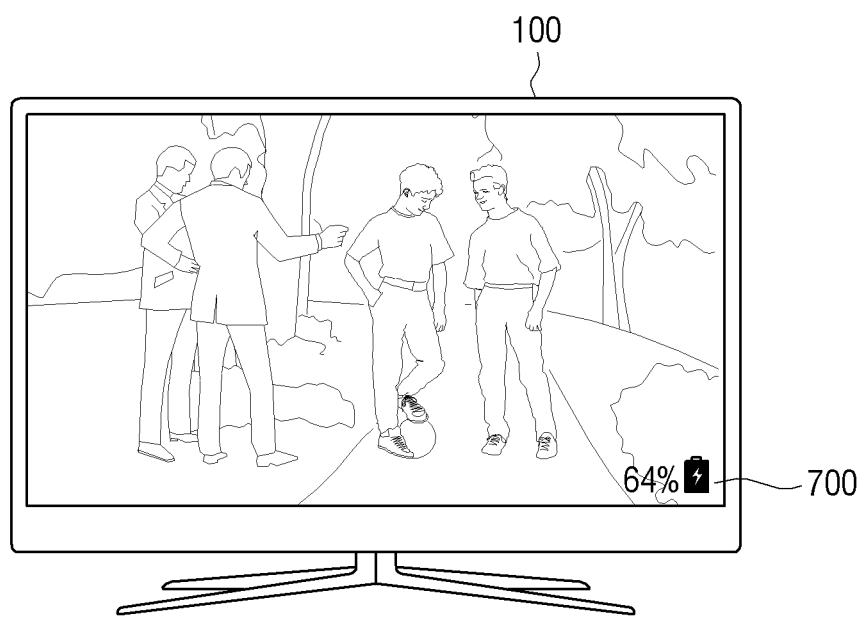
FIG. 7 is a view illustrating that a display apparatus displays an indicator to indicate that a battery is being recharged in a normal mode according to an exemplary embodiment.

FIGS. 6 and 7 are views illustrating a method for the display apparatus 100 to indicate a recharge of the battery 200.

As illustrated in FIG. 6, the display apparatus 100 may display an indicator to indicate that the battery 200 is being recharged in a standby mode. For example, if the display apparatus 100 enters a standby mode and after determining that the battery level of the battery 200 is less than a threshold value, consumes standby power by using the AC power only and recharges the battery 200, the display apparatus 100 may control the color of an LED 600, or the number or frequency of a flickering of the LED 600 provided on a bezel of the display apparatus 100 to inform a user that the battery 200 is being recharged.

FIG. 7 is a view illustrating a UI 700 to indicate that the battery 200 is being recharged when the display apparatus 100 is in a normal mode. While displaying content, the display apparatus 100 may display the UI 700 on part of the display 140, which indicates that the battery 200 is being recharged. Accordingly, a user may be informed through the UI 700 that the battery 200 is being recharged and of a percentage that the battery has been recharged.

However, the UI 700 illustrated in FIG. 7 is only an example, and the display apparatus 100 may display a UI to indicate that the battery 200 is being recharged in various ways, such as a UI having simply the shape of the battery 200.

Alternatively, the display apparatus 100 may display a UI to indicate that the battery 200 is being recharged only when a user command is input so as to minimize inconvenience that a user may experience when using a displayed content.

Figure 8:
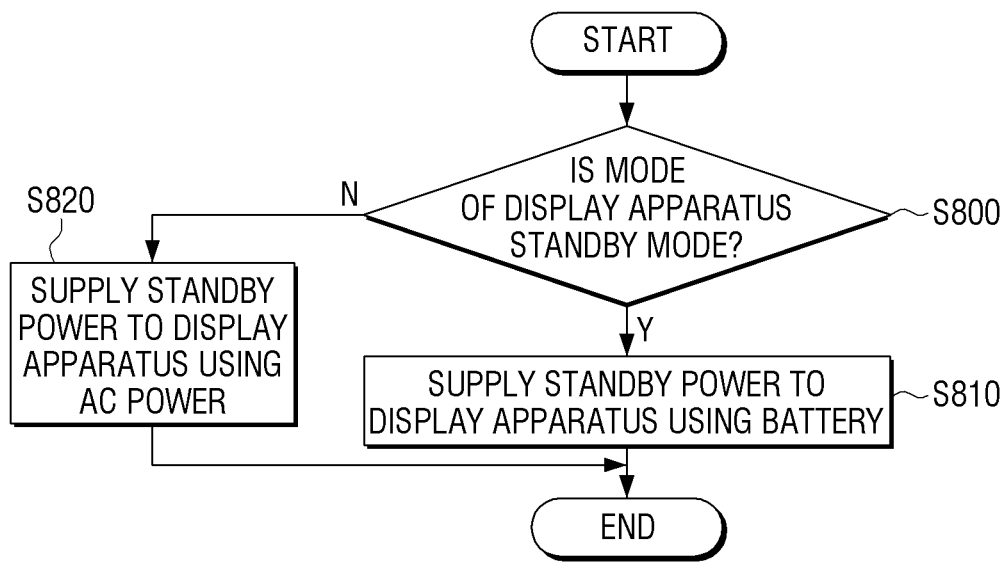
FIG. 8 is a flowchart provided to explain a controlling method of a display apparatus according to an exemplary embodiment.

FIG. 8 is a flowchart illustrating a controlling method of the display apparatus 100 according to an exemplary embodiment.

First of all, the display apparatus 100 determines whether the display apparatus 100 is in a standby mode or not (S800). If the display apparatus 100 is in a standby mode (S800-Y), the display apparatus 100 supplies standby power to the display apparatus 100 using the battery 200 (S810).

The battery 200 may be inserted into the display apparatus 100. In other words, the battery 200 may be built in part of the display apparatus 100. The battery 200 may be detachably built-in after removing a cover which covers part of the display apparatus 100, but this is only an example. The battery 200 may be fixedly built in the display apparatus 100 such that it cannot be detached without disassembling the display apparatus 100.

Accordingly, the display apparatus 100 may consume standby power by using the above-described battery 200.

Meanwhile, if the display apparatus 100 is not in a standby mode (S800-N), the display apparatus 100 supplies standby power to the display apparatus 100 by using the AC power (S820).

In other words, if the display apparatus 100 is not in a standby mode, it is determined that the display apparatus 100 is in a normal mode. Accordingly, the display apparatus 100 in a normal mode may supply standby power to the display apparatus 100 using the AC power. In addition, the display apparatus 100 may control to recharge the battery 200 by using the AC power in a normal mode.

Figure 9:
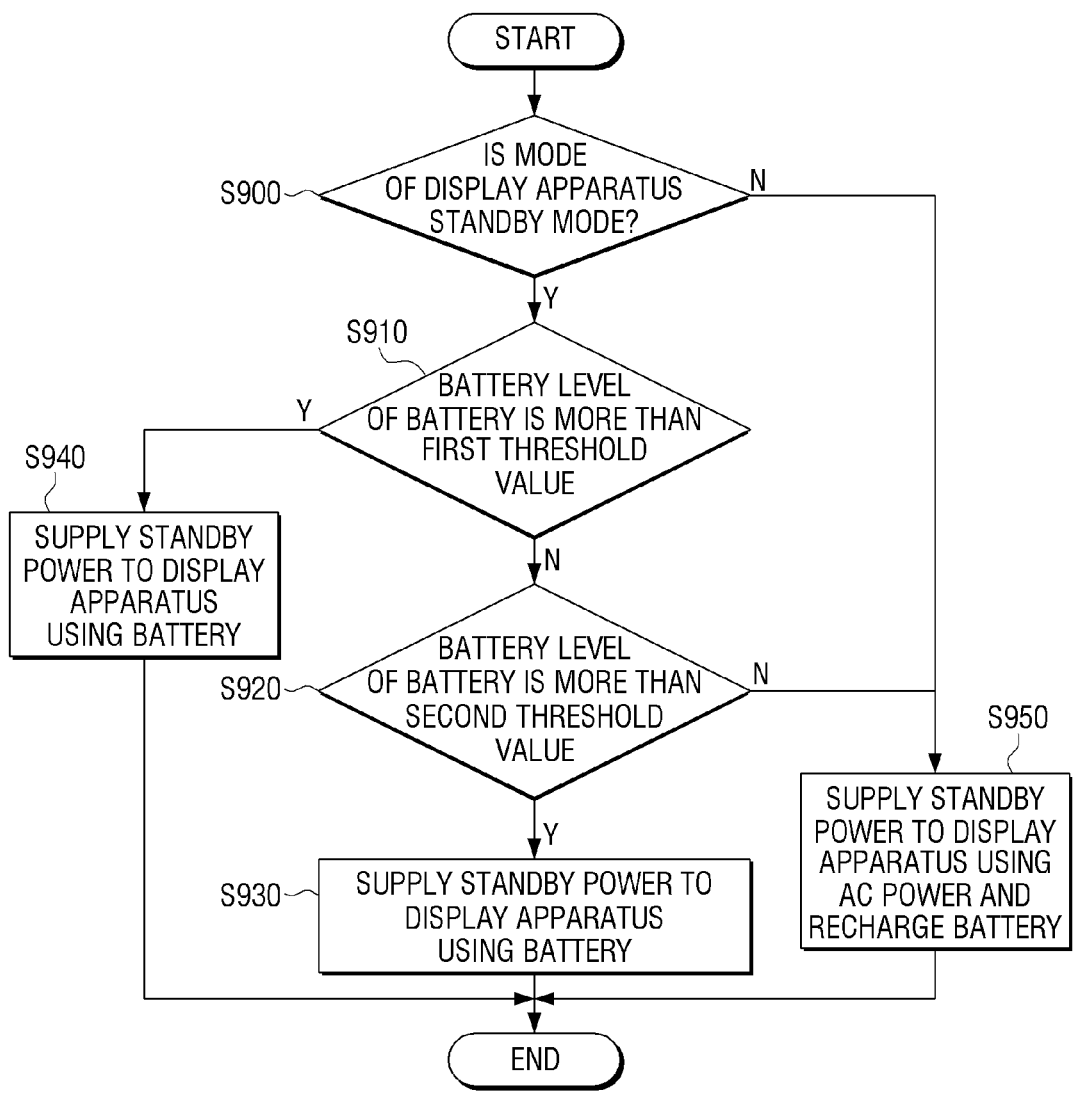
FIG. 9 is a flowchart provided to explain a controlling method of a display apparatus in detail according to an exemplary embodiment.

FIG. 9 is a flowchart illustrating a controlling method of the display apparatus 100 in detail according to an exemplary embodiment.

First of all, the display apparatus 100 determines whether the display apparatus 100 is in a standby mode or not (S900). If the display apparatus 100 is in a standby mode (S900-Y), the display apparatus 100 determines whether the battery level of the battery 200 is more than the first threshold value (S910).

If it is determined that the battery level of the battery 200 is less than the first threshold value (S910-N), the display apparatus 100 determines whether the battery level of the battery is more than the second threshold value (S920). If the battery level of the battery is less than the first threshold value (S910-N) and more than the second threshold value (S920-Y), the display apparatus 100 is supplied with standby power by using the battery 200 (S930). In particular, the display apparatus 100 may consume standby power by using the AC power and the battery 200 alternately. For example, the display apparatus 100 may consume standby power by using the AC power for the first ten minutes and consume standby power by using the battery 200 for the next ten minutes.

Meanwhile, if the battery level of the battery is less than the second threshold value (S920-N), the display apparatus 100 may be supplied with standby power by using the AC power and recharge the battery 200 (S950). In other words, the display apparatus 100 may recharge the battery 200 until the battery level of the battery 200 reaches a certain level.

If the display apparatus 100 which enters a standby mode determines that the battery level of the battery 200 is more than the first threshold value (S910-Y), the display apparatus is supplied with standby power by using the battery 200 (S940). In other words, if the battery level of the battery 200 is sufficient, the display apparatus 100 may consume standby power by using the battery 200 only.

As described above, by using the display apparatus 100 where a battery is built-in or detachably attached, a user may use the display apparatus 100 with reduced standby power.

The controlling method of a display apparatus according to the above-described various exemplary embodiments may be coded in software and stored in a non-transitory readable medium which may be mounted and used in various apparatuses.

The non-transitory computer readable medium does not mean a medium storing data for a short period such as a register, a cash, a memory, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

Hereinabove, although the exemplary embodiments of the present disclosure have been shown and described, it should be understood that the present disclosure is not limited to the disclosed embodiments and may be variously changed by those skilled in the art without departing from the spirit and the scope of the present disclosure. Therefore, the present disclosure should be construed as including all the changes, equivalents, and substitutions included in the spirit and scope of the present disclosure.

What is claimed is:

1. A display apparatus, comprising:
a power supply configured to supply power to the display apparatus using one of a battery and AC power; and
a controller configured to, in response to a mode of the display apparatus being a standby mode, control the power supply to supply power for standby power to the display apparatus using the battery,
wherein the controller is further configured to measure a battery level of the battery and if the battery level of the battery is less than a first threshold value and equal to or more than a second threshold value, control the power supply to supply the standby power to the display apparatus using the battery and the AC power alternately without recharging the battery.

2. The apparatus as claimed in claim 1, wherein the controller, in response to a mode of the display apparatus being a normal mode, controls the power supply to recharge the battery using the AC power.

3. The apparatus as claimed in claim 1, wherein the power supply further comprises:
a switch configured to switch the AC power and the battery,
wherein the controller controls the switch to use the battery and the AC power alternately.

4. The apparatus as claimed in claim 1, wherein the controller, in response to a battery level of the battery being less than a second threshold value, controls the power supply to supply standby power to the display apparatus using the AC power and to recharge the battery.

5. The apparatus as claimed in claim 1, wherein the controller comprises:
a sub controller configured to be turned on and control the display apparatus while the display apparatus maintains a standby mode,
wherein the sub controller, in response to a mode of the display apparatus being a standby mode, determines a battery level of the battery.

6. The apparatus as claimed in claim 1, further comprising:
a display,
wherein the controller, in response to the battery being recharged, controls the display to display a user interface (UI) to indicate that the battery is being recharged.

7. The apparatus as claimed in claim 1, wherein the controller, in response to the battery being recharged, controls to output an indicator indicating that the battery is being recharged.

8. A controlling method for a display apparatus, comprising:
determining a mode of a display apparatus including a battery;
measuring a battery level of the battery; and
in response to the mode being a standby mode, supplying standby power to the display apparatus using the battery,
wherein the supplying standby power comprises, if the battery level of the battery is less than a first threshold value and equal to or more than a second threshold value, supplying standby power to the display apparatus using the battery and the AC power alternately without recharging the battery.

9. The method as claimed in claim 8, further comprising:
in response to a mode of the display apparatus being a normal mode, recharging the battery using AC power.

10. The method as claimed in claim 8, wherein the supplying standby power comprises using the battery and the AC power alternately by controlling a switch configured to switch the battery and the AC power.

11. The method as claimed in claim 8, wherein the supplying standby power comprises, in response to a battery level of the battery being less than a second threshold value, supplying standby power to the display apparatus using the AC power and recharging the battery.

12. The method as claimed in claim 8, wherein the measuring the battery level of the battery comprises determining the battery level of the battery by a sub controller configured to be turned on and control the display apparatus while the display apparatus maintains a standby mode.

13. The method as claimed in claim 9, further comprising:
in response to the battery being recharged, displaying a user interface (UI) to indicate that the battery is being recharged.

14. The method as claimed in claim 8, further comprising:
in response to the battery being recharged, outputting an indicator indicating that the battery is being recharged.

15. A non-transitory computer readable storage medium storing a controlling method for a display apparatus, the method comprising:
determining a mode of a display apparatus including a battery; and
measuring a battery level of the battery;
in response to the mode being a standby mode, supplying standby power to the display apparatus using the battery,
wherein the supplying standby power comprises, if the battery level of the battery is less than a first threshold value and equal to or more than a second threshold value, supplying standby power to the display apparatus using the battery and the AC power alternately without recharging the battery.

* * * * *